United States Patent
Han et al.

(10) Patent No.: US 8,086,405 B2
(45) Date of Patent: Dec. 27, 2011

(54) COMPENSATION FOR MOUNTING MISALIGNMENT OF A NAVIGATION DEVICE

(75) Inventors: Shaowei Han, Palo Alto, CA (US); Xiaoji Niu, Shanghai (CN); Changlin Ma, Cupertino, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 1107 days.

(21) Appl. No.: 11/823,964

(22) Filed: Jun. 28, 2007

(65) Prior Publication Data

US 2009/0254279 A1  Oct. 8, 2009

(51) Int. Cl.
*G01C 21/00* (2006.01)

(52) U.S. Cl. ........ 701/216; 701/207; 701/214; 701/217; 701/220; 73/1.37; 73/1.38; 73/1.77

(58) Field of Classification Search ........... 701/207, 701/214, 216, 217, 220, 221; 73/1.37, 1.38, 73/1.77, 503, 503.3, 504.02, 504.03, 511, 73/514.01; 342/357.14
See application file for complete search history.

(56) References Cited

U.S. PATENT DOCUMENTS

| | | | | |
|---|---|---|---|---|
| 4,127,249 A | * | 11/1978 | Lambregts | 244/191 |
| 4,321,678 A | * | 3/1982 | Krogmann | 701/220 |
| 5,422,817 A | | 6/1995 | Tazates et al. | 702/93 |
| 5,878,357 A | * | 3/1999 | Sivashankar et al. | 701/1 |
| 5,890,093 A | | 3/1999 | Mark et al. | 701/220 |
| 5,928,309 A | | 7/1999 | Korver et al. | 701/214 |
| 6,097,337 A | | 8/2000 | Bisio | |
| 6,151,551 A | | 11/2000 | Geier et al. | |
| 6,282,496 B1 | | 8/2001 | Chowdhary | 701/220 |
| 6,285,954 B1 | | 9/2001 | Mark et al. | 701/221 |
| 6,446,005 B1 | | 9/2002 | Bingeman et al. | |
| 6,532,419 B1 | * | 3/2003 | Begin et al. | 701/220 |
| 6,622,091 B2 | * | 9/2003 | Perlmutter et al. | 701/214 |
| 6,647,352 B1 | | 11/2003 | Horton | 701/151 |
| 6,782,315 B2 | | 8/2004 | Lu | 701/45 |
| 6,801,855 B1 | | 10/2004 | Walters et al. | 701/216 |
| 6,915,205 B2 | * | 7/2005 | Kim et al. | 701/207 |
| 6,931,322 B2 | | 8/2005 | Jung et al. | |
| 7,124,026 B2 | | 10/2006 | Hong | |
| 7,248,964 B2 | | 7/2007 | Bye | 701/200 |

(Continued)

FOREIGN PATENT DOCUMENTS

WO  WO00/17601  3/2000

(Continued)

OTHER PUBLICATIONS

Bar-Itzhack I Y, Oshman Y. (1985). "Attitude Determination from Vector Observations: Quaternion Estimation", IEEE Transactions on Aerospace and Electronic Systems, 1985, v AES-21(1): 128-136.

(Continued)

*Primary Examiner* — Hussein A. Elchanti
*Assistant Examiner* — Rami Khatib
(74) *Attorney, Agent, or Firm* — Pillsbury Winthrop Shaw Pittman LLP

(57) ABSTRACT

Compensating for the misalignment of a navigation device with respect to a vehicle is described. In one example, the compensation is made by applying a high pass filter to a measured acceleration of the vehicle to produce a motion acceleration signal, weighting the motion acceleration signal with a measured steering rate of the vehicle, and deriving misalignment parameters for the navigation device with respect to the vehicle using the weighted motion acceleration signal.

15 Claims, 5 Drawing Sheets

U.S. PATENT DOCUMENTS

| | | | |
|---|---|---|---|
| 7,286,933 B2 | 10/2007 | Cho | 701/216 |
| 7,337,650 B1 | 3/2008 | Preston et al. | 73/1.38 |
| 7,392,116 B2* | 6/2008 | Kesselgruber | 701/1 |
| 7,400,946 B2* | 7/2008 | Lee et al. | 701/1 |
| 7,430,367 B2* | 9/2008 | Imada | 396/55 |
| 7,437,230 B2* | 10/2008 | McClure et al. | 701/50 |
| 2002/0022924 A1 | 2/2002 | Begin | 701/207 |
| 2004/0027278 A1 | 2/2004 | Park | |
| 2004/0036650 A1 | 2/2004 | Morgan | 342/357.14 |
| 2004/0044477 A1 | 3/2004 | Jung et al. | |
| 2004/0181335 A1 | 9/2004 | Kim et al. | |
| 2004/0215380 A1* | 10/2004 | Song | 701/37 |
| 2005/0137800 A1 | 6/2005 | Hong | |
| 2006/0100781 A1* | 5/2006 | Lin et al. | 701/216 |
| 2006/0165398 A1* | 7/2006 | Imada | 396/55 |

FOREIGN PATENT DOCUMENTS

| | | |
|---|---|---|
| WO | WO/02/18873 A2 | 3/2002 |
| WO | WO02/018873 | 7/2002 |
| WO | WO2007/059134 | 5/2007 |

OTHER PUBLICATIONS

Gao Z Y, Niu X J, Guo M F.(2002) "Quaternion-based Kalman Filter for Micro-machined Strapdown Attitude Heading Reference System", Chinese Journal of Aeronautics, Aug. 2002, 15(3): 171-175.

Creamer Glen, (1996) "Spacecraft Attitude Determination Using Gyros and Quaternion Measurements", Journal of the Astronautical Sciences, 1996, 44(3): 357-371.

Lefferts E J, Markley F L, Shuster M D (1982), "Kalman Filtering for Spacecraft Attitude Estimation", Journal of Guidance, Control, and Dynamics, 1982, 5(5): 417-429.

Maybeck, Peter S. (1979), "Stochastic Models, Estimation and Control" (vol. 1), New York: Academic Press, 1979.

* cited by examiner

COMPENSATION FOR MOUNTING MISALIGNMENT OF A NAVIGATION DEVICE

BACKGROUND

1. Field

The present description pertains to the field of determining the location of a vehicle using a portable navigation device and, in particular, to correcting location determinations to compensate for the possible misalignment of the portable location device in a vehicle.

2. Related Art

With the development of radio and space technologies, several satellite based navigation systems have already been built and more will be in use in the near future. One example of such satellite based navigation systems is the Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any one time as many as six satellites are visible at any one location on the surface of the earth (except near the Earth's poles). Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

GPS and other satellite based navigational systems have some limitations such as the availability of a sufficient number of satellite signals. Satellite signals are sometimes not available in deep canyons, in areas with large numbers of buildings blocking the direct satellite signals, and in dense forest areas. In addition to this, the satellite signals can be completely blocked or greatly attenuated inside buildings. In addition, tunnels and bridges can block satellite signals resulting in large jumps in the indicated position at the exit of the tunnel after new satellite signals are received. In addition to this, some parameters like the steering of the vehicle, etc cannot be measured using satellite signals. To reduce these errors, other complementary methods are often used with satellite navigational systems to prevent interruptions in the position information. Inertial sensors such as gyroscopes are used to measure changes in direction. Accelerometers are used to estimate the acceleration of the vehicle, both backwards and forwards and from side to side. A host of similar devices are used to improve the accuracy and the consistency of a navigation system.

The application of low-end MEMS inertial sensors for land vehicle navigation is becoming popular because of the significant cost reduction in these sensors. After the position of a vehicle is initially determined, the inertial sensors allow the position of the vehicle to be determined as the vehicle moves, even if the satellite signals are blocked. The determination of the position based on measuring the vehicle movement is known as dead reckoning. The accuracy of a dead reckoning position and how long it remains accurate depends on the quality of the sensors and how well they are calibrated. In some systems dead reckoning is also used to improve the accuracy of the satellite location determinations.

For built-in systems, inertial sensors are mounted on the vehicle in a fixed, known position, with good accuracy, so as to use some motion constraint of the vehicles, such as a non-holonomic constraint, to improve the navigation accuracy. This works well for satellite-based navigation systems that are permanently installed in a car, such as those offered by the manufacturer.

Personal navigation devices (PND) are often inserted into a cradle, placed on the dashboard or put in some other temporary location inside the vehicle. The position of the PND with respect to the vehicle can differ each time the PND is brought back into the vehicle. There also may be adjustment of the angles of its position. Assuming the PND is mounted so that its screen is visible to the driver, the misalignment between the device and the vehicle might be any angle between +/−45 degrees for yaw and +/−30 degrees for roll and pitch. If the PND does not have a cradle and does not have a display screen, then the misalignment can be greater.

In either case, estimating and compensating for the misalignment angles can greatly increase the accuracy of any navigation using dead reckoning. Estimating and compensating for misalignment is even more important for incomplete inertial sensor configurations, for example a heading gyro combined with a three-axis accelerometer. Incomplete systems are often used for vehicle navigation to further reduce the cost of the navigation system. In this case, the alignment between the inertial sensors and the vehicle becomes more important when the omitted sensors are replaced by assumptions about the vehicle's motion.

SUMMARY

Compensating for the misalignment of a navigation device with respect to a vehicle is described. In one example, the compensation is made by applying a high pass filter to a measured acceleration of the vehicle to produce a motion acceleration signal, weighting the motion acceleration signal with a measured steering rate of the vehicle, and deriving misalignment parameters for the navigation device with respect to the vehicle using the weighted motion acceleration signal.

BRIEF DESCRIPTION OF THE DRAWINGS

The invention can be more fully appreciated in connection with the following detailed description taken in conjunction with the accompanying drawings, in which like reference numerals refer to corresponding parts throughout the several views of the drawings, and in which.

DETAILED DESCRIPTION

Figure 1:
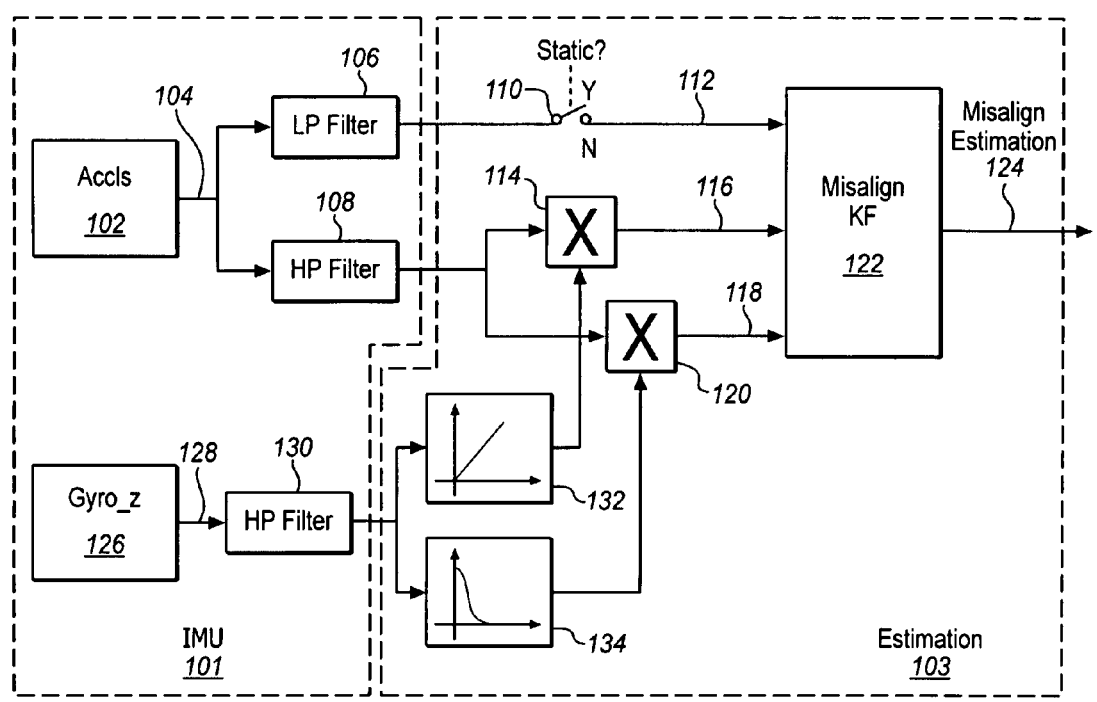
FIG. 1 is a functional block diagram of a portion of a navigation device to show estimating the mounting misalignment of the navigation device, according to an embodiment of the present invention.

Any misalignment between the inertial sensors used by a navigation device and a vehicle carrying the inertial sensors, such as a car or a truck, can affect the navigation device's accuracy. This misalignment can be estimated and the estimates used to compensate for the misalignment. This is particularly useful for portable navigation devices since a portable navigation device is normally installed without strictly aligning the device in the vehicle. The misalignment is therefore likely to be different each time the navigation device is removed and returned again to the vehicle.

The typical inertial sensors used for vehicle navigation are accelerometers and gyroscopes. These may be part of a separate removable portable navigation device, or they may be mounted to the vehicle. In some cases, the sensors may also be used for other systems, such as stability control, anti-lock braking, traction control, airbag control and other control systems. The vehicle's motion and raw inertial sensor outputs can be used to make misalignment estimates. In other words, the misalignment between a navigation device and the vehicle in which it is riding can be determined using just the inertial sensor signals. No additional external information, for example a GPS signal, is required. Such a misalignment estimation is robust and can be executed immediately following power-on, before the GPS is ready.

The misalignment estimation can also be thought of as estimating the relationship between the PND (Personal Navigation Device) frame and the vehicle frame. A general principle to estimate the rotational relationship between two frames is to find at least two non-collinear vectors that are known in these two frames. In one embodiment, to estimate the attitude of the PND with respect to the vehicle, the following three vectors can be used: a gravity vector, a synthetic steering vector, and a synthetic acceleration/braking vector.

The gravity vector points vertically down in the navigation frame. If the vehicle is on level ground, then the vehicle's z-axis (vertical axis) is aligned with gravity. This means that the gravity vector is known in the vehicle frame. The gravity vector can be sensed by an accelerometer in the PND frame. If there is no disturbance from any motion acceleration, for example when the vehicle is standing still, then the gravity vector can easily be isolated. Even when the vehicle is moving, gravity is still the major DC (Direct Current) or constant part of the acceleration (accl) output. Therefore, the gravity vector can be used to estimate the misalignment between the accelerometer and the vehicle even when the vehicle is moving.

In real life circumstances, there is some chance that a vehicle will be parked on a slope, either from a hill, driveway, ramp, or uneven ground. However, when the vehicle in being driven, it will probably not drive on the same sloped surface for a long time. Therefore, more reliable results can be obtained by not using the gravity vector when the vehicle is static or parked, but only when the vehicle is moving. The disturbance of the motion acceleration can be suppressed by a low-pass (LP) filter with a very low cut-off frequency.

The second vector is a synthetic vector based on steering the vehicle around turns. When the vehicle makes turns, centrifugal acceleration appears in a lateral direction, perpendicular to the direction of straight line motion. The specific direction (left or right) of the centrifugal acceleration depends on the direction of the turn. This direction is known in the vehicle frame of reference. It can also be measured in the PND frame of reference. Without perfect correct alignment of the PND accelerometers with the vehicle frame, however, the centrifugal accelerometers will be affected by disturbances from gravity and any forward or reverse acceleration.

In one embodiment, to avoid the disturbance from gravity, a high-pass filter is used to remove the gravity and only keep the AC (Alternating Current) part of the accelerometer signal.

In other words, since gravity is almost constant, the change in acceleration can be attributed to the steering.

In one embodiment, to separate the centrifugal acceleration from the forward acceleration and deceleration, the specific force change is multiplied by the heading gyro output. In other words, the acceleration is directly weighted by the steering rate. The multiplication can be represented as:

$$k \cdot \omega_z \cdot \vec{f} \quad \text{(Eq. 1)}$$

where, $\vec{f}$ is the tri-axis accelerometer output;
$\omega_z$ is the heading gyro output, from a z-axix gyro, for example; and
k is a coefficient, which can be set as 1.

Since the centrifugal acceleration is strongly related to the steering rate, it will be significantly amplified by the weighting factor, compared to the forward acceleration that is not correlated to the steering rate. The effect is similar to a correlation amplifier. In addition, the weighting will cause the synthetic vector to point to the right, independent of the direction of the acceleration and independent of left and right with respect to the vehicle.

The third vector is a synthetic vector based on accelerating or braking the vehicle. This can be described as the vehicle's forward acceleration and deceleration. The direction of this vector is known in the vehicle frame and it can be measured by the accelerometer in the PND frame. Again, the steering rate is used to weight the accelerometer signal, but in an inverse way. The weighting function can be expressed as:

$$e^{-k \cdot \omega_z} \cdot \vec{f} \quad \text{(Eq. 2)}$$

where, k is a coefficient, which can be set as 10 empirically. The other variables are as in equation 1.

In one embodiment, in addition to the inverse weighting from $e^{-k \cdot \omega_z}$, the direction of the forward acceleration is also determined. One solution is to use the sign of the forward accelerometer output (accl-x) as the direction of the acceleration. This assumes that the PND will always be mounted facing in the same direction. For a PND with a display screen, the PND will typically be mounted with its screen facing either the driver or the front passenger, so this is a safe assumption. If the PND has a cradle that is mounted in the car, then it also will be mounted in the same general direction and position each time it is placed in the cradle.

FIG. 1 is a functional block diagram of a portion of a navigation device. The functional blocks in this embodiment are used to estimate the misalignment of the sensors used by the navigation device. For a PND, this misalignment can come from the PND not being properly aligned in the vehicle. In FIG. 1, two components of an IMU (Inertial Measurement Unit) 101, an accelerometer and a gyroscope are represented by blocks 102 and 126, respectively. In practice, there can be more than one gyroscope and accelerometer. In one embodiment, there are three orthogonal accelerometers and three orthogonal gyroscopes.

In another embodiment, the IMU is configured with a three-axis acceleration device and a one-axis gyro device. The one-axis gyro device gives heading change information. This can be done with a z-axis (vertical) gyro. In another embodiment, the IMU is configured with a three-axis acceleration device and a two-axis gyro device. The two-axis gyro device can be a single two-axis device or two one-axis devices, in which the heading change information is given. Another configuration is a three-axis acceleration device and a three-axis gyro device. The gyro device can be a single three-axis gyro device or a 3-axis gyro device formed of one-axis or two-axis devices. Four axis configurations can be used to provide redundancy, both for accuracy and reliability.

The output of the accelerometer 102 is the vector $\vec{f}$ indicated as 104. This output 104 is low and high pass filtered through a low pass filter 106 and a high pass filter 108, respectively. The low-pass filter is used to filter out the high frequency signal and retain the DC (Direct Current) or steady state signal which represents primarily the gravity component of the signal. The high-pass filter is used to filter out the low frequency signal and retain the AC (Alternating Current) or dynamic component of the signal which represents the motions of the vehicle.

The low pass filtered accelerometer signal goes through a switch 110, which will turn on when the vehicle is moving. This can be implemented physically as shown or as logic or a function, depending on the implementation. The logical switch provides the logic described for determining the gravity vector. Then the signal 112, the gravity vector can be fed into a misalignment estimation logic, for example a Kalman filter (KF) 122. The switch and the Kalman filter are components of an estimation module 103.

On the other hand, the high pass filtered signal of the accelerometer is also applied to the estimation module 103. The estimation module weights the high pass filtered accelerometer signal by the heading gyro 126 signal, which represents the steering rate of the vehicle, in two ways. The first weighting is a proportional weighting 114 as described, for example, with respect to Equation 1, the other weighting is an inverse proportional weighting 120, as described, for example, with respect to Equation 2.

In one embodiment, the proportional weighting factor is the heading angle rate from the gyro sensor. The proportional weighting factor gives a higher weight to the centrifugal acceleration signal if the heading change or steering rate is large, or in other words if the vehicle is turning. In one embodiment, the inverse proportional weighting factor is the heading angle rate from the gyro sensor which gives a higher weight to the forward acceleration signal if the heading change is small, or in other words, if the vehicle is going straight.

Both weighted signals 116 and 118 are fed into the misalignment estimation Kalman filtering system 122 of the estimation module 103. The filtering system outputs the estimated misalignment angles 124, using the three input vectors 112, 116, and 118. In one embodiment, the Kalman filtering system uses the three vectors, the gravity vector, the centrifugal acceleration vector, and the forward acceleration vector to estimate three angles which represent the misalignment between the navigation device and the vehicle that it is riding in. The filtering translates the gravity signal, centrifugal acceleration signal and the forward acceleration signals to the three angles of misalignment. These angles can be expressed as roll, pitch, and yaw, or x, y, and z, or r, θ, and φ, or in any other way. Alternatively, other correction parameters may be used. The correction angles or other parameters may also be normalized, factored, weighted, scaled, or modified in any other way to ease their use by the associated equipment. In the present example, roll, pitch and yaw are used for the misalignment angles, but any other frame of reference or coordinate system can be used. The Kalman filtering process is described in more detail below.

The weighting scheme for the AC part of the accelerometer signal is shown in the lower half of FIG. 1. The heading gyro signal 128 first passes through a high pass filter. 130; then, in the estimation module 103, the proportional weight 132 and the inverse proportional weight 134 are generated. These can be generated as described above with respect to equations 1 and 2. The two weights are next multiplied with the AC part or filtered part of the accelerometer signal at 114 and 120 to produce a steering vector and an acceleration vector, respectively.

The misalignment estimation produces parameters that may be used either to correct the raw sensor data from the IMU or are used as factors in the location system, or both. In one embodiment, the misalignment parameters are expressed as roll, pitch, and yaw correction angles. However, in other embodiments, the results can be expressed in other ways. In one example, these correction angles are used to adjust the raw inertial sensor data. In another example, the angles are used by the location system of the navigation device as correction factors. The misalignment estimation can be made continuously. For higher accuracy, after the first misalignment adjustment is done, the next repetition of determining the angles can be done using the previously estimated misalignment angles. This makes the second determination more accurate than the first. With additional repetitions, the error angles will converge toward some value that is more accurate than might otherwise be obtained.

The navigation device can determine the location of the vehicle in a variety of different ways. Some location systems use satellite navigation systems, for example GPS, Glonass, Galileo, Baidou (compass), or other similar systems developed by different regions. Some location systems use signals from terrestrial radio systems which can provide positions, for example cellular telephone, wireless mobile networking, proprietary inventory tracking systems, and other similar systems depending on the location and region.

In an example of a misalignment Kalman filter 122 an optimizing recursive data processing approach is used. In other words, it combines the provided measurement data, with prior data about the system and the measuring devices, to produce an estimate of the misalignment that attempts to minimize the errors statistically. In one example, the system is modeled as a system equation (linear difference or differential equation with Gaussian white noise) and a measurement equation (linear equation with Gaussian white noise) as described below.

The System Model or system equation can be provided as:

$$x(t_{i+1}) = \Phi(t_{i+1,i})x(t_i) + G(t_i)w(t_i) \quad \text{(Eq. 3)}$$

where, x is the state vector, which includes the information to be estimated;
Φ is the state transition matrix;
G is the system noise matrix; and
w is the system noise, whose covariance matrix is Q.

The Measurement Model or measurement equation can be provided as:

$$z(t_i) = H(t_i)x(t_i) + v(t_i) \quad \text{(Eq. 4)}$$

where, z is the measurement vector, which is constructed based on the measurements of the system;
H is the measurement matrix; and
v is the measurement noise, whose covariance matrix is R.

In the present example, the Kalman filtering system makes use of the system model to predict the state vector for the next epoch, and makes use of the measurement model to correct the predicted state vector, as shown below:

The state prediction can be provided by Equation 5 as follows:

$$x(t_{i+1}^-) = \Phi \cdot x(t_i)$$

$$P(t_{i+1}^-) = \Phi \cdot P(t_i) \cdot \Phi^T + G(t_i) \cdot Q \cdot G^T(t_i) \quad \text{(Eq. 5)}$$

where P is the covariance matrix of the predicted state x.

State correction:

Given the predicted state x, it can be corrected using the state correction of Equation 6 as follows:

$$x(t_i) = x(t_i^-) + K(t_i) \cdot [z(t_i) - H \cdot x(t_i^-)]$$

$$P(t_i) = P(t_i^-) - K(t_i) \cdot H \cdot P(t_i^-)$$

$$K(t_i) = P(t_i^-) \cdot H^T [H \cdot P(t_i^-) \cdot H^T + R]^{-1} \quad \text{(Eq. 6)}$$

where, P is now the covariance matrix of the corrected state x; and

K is the gain matrix.

To apply this Kalman filter system to the misalignment estimation more specifically, the state vector x is designed with the system model, and the measurement vector z is designed with the measurement model. The three misalignment angles (roll, pitch, and yaw) are put into the state vector so that these angles are estimated. The angles can be modeled as an appropriate stochastic process, such as a random constant as suggested in Equation 7.

$$x_{i+1} = x_i \quad \text{(Eq. 7)}$$

Equation 7 shows a very simple system model as compared to the standard form in Equation 3. While such a simple model is sufficient for many purposes, more complex forms can be developed where higher accuracy or more complex hardware is anticipated. Other stochastic models like random walk or Gauss-Markov processes can also be used depending on the variation of the misalignment with time.

The measurement vector and measurement model can be derived from the relation between the misalignment and the three vectors mentioned above, (for example the gravity vector, the centrifugal vector, and the acceleration vector). Equation 8 shows using the gravity vector as an example.

$$a^b = C_v^b \cdot a_0^v + v \quad \text{(Eq. 8)}$$

where, $C_v^b$ is the rotation matrix from the vehicle frame to the IMU (Inertial Measurement Unit) body frame, which is another form of the three misalignment angles (roll, pitch, and yaw), $a^b$ is the gravity vector measured by the accelerometer in the IMU body frame;

$a_0^v$ is the gravity vector in the vehicle frame, which is known as $[0\ 0\ g]^T$; and v is the measurement error of the accelerometer, which not only includes the sensor error but also includes the disturbances of the vehicle's motion.

Disturbing the equation with misalignment error and making linearization, changes the measurement equation as follows:

$$\delta \hat{a}^b = 2 \lfloor \hat{a}^b \rfloor q_e + v \quad \text{(Eq. 9)}$$

where, $\hat{a}^b = \hat{C}_v^b \cdot a_0^v$;

$\hat{C}_v^b$ is the rotation matrix based on the predicted misalignment from the system model; and $$\delta \hat{a}^b = a^b - \hat{C}_v^b \cdot a_0^v \quad \text{(Eq. 10)}$$

$q_e$ is the error of the misalignment in quaternion form. This equation matches the form of a conventional measurement model of a Kalman filter as expressed in equation 4.

Similar derivations can be applied to the other two vectors. Once the system model and the measurement model are constructed, the conventional Kalman filter algorithms, shown, for example, in equations 5 and 6, can be applied directly to estimate the state vector, in this case the misalignment error $q_e$, and then correct the misalignment angles.

Figure 2:
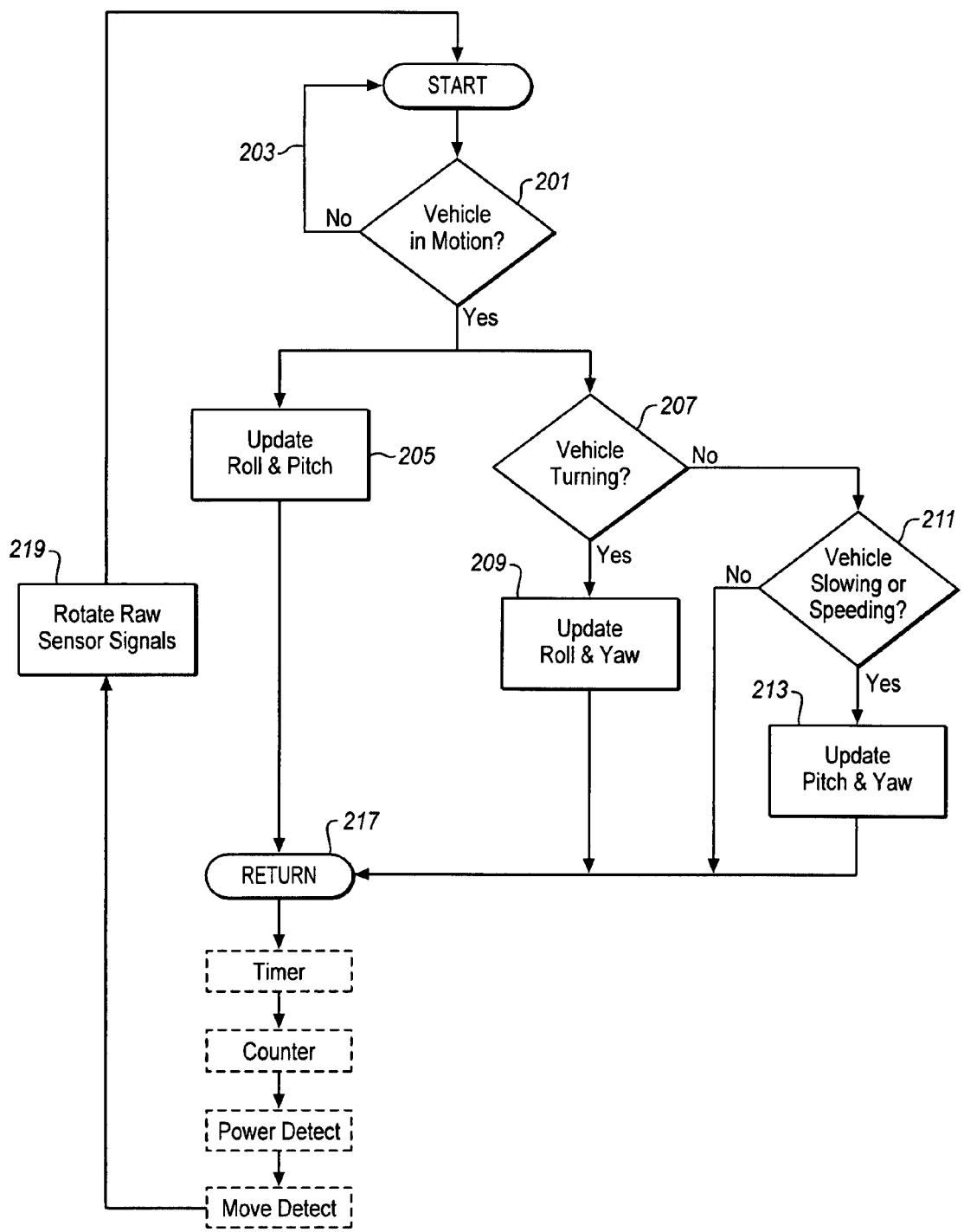
FIG. 2 is a process flow diagram of estimating the mounting misalignment of a navigation device according to an embodiment of the present invention.

FIG. 2 is a process flow diagram of another aspect of the operation of the navigation device described in FIG. 1. In FIG. 2, in brief, the gravity vector updates the roll and pitch misalignment angles all the time except when the vehicle stops. When the vehicle turns, the weighted centrifugal vector updates the roll and yaw. When the vehicle goes straight and changes speed, as in accelerating and braking, the weighted acceleration vector updates the pitch and yaw. As a result, the misalignment always gets updated except when the vehicle is standing still or goes straight with a constant speed so that there are no acceleration sensor outputs.

Considering FIG. 2 in more detail, the process begins at decision block 201 by determining whether the vehicle is in motion. If it is not, then branch 203 returns to the start and no action is taken. This determination can be made by determining whether there is any AC content in the signals from the accelerometers. It can also be done by receiving an odometer signal from the vehicle. It can also be done using the location system. If the location is not changing, then the system can infer that the vehicle is not moving.

If the vehicle is moving, then the DC component of the measured acceleration, the gravity vector, is used to determine roll and pitch for the vehicle at block 205. This is described above using the Kalman filtering system 122. In addition, if the vehicle is in motion, then at decision block 207, it is determined whether the vehicle is turning. If the vehicle is turning, then the roll and yaw are updated at block 209. There are different ways to determine whether the vehicle is turning. One way is to use a gyro in the navigation device. Another way would be to receive input from the steering wheels, a camera aimed in front of the car or on the ground, or to measure vehicle acceleration. The roll and yaw can be determined using the centrifugal portion of the motion acceleration as described above.

If the vehicle is not turning, then it can be determined whether the vehicle is speeding up or slowing down at decision block 211. This can be done using the accelerometers as described above, or in any other way. If the vehicle is speeding up or slowing down, then the pitch and yaw of the vehicle can be determined at block 213.

Each determination of roll, pitch, or yaw and each decision not to make such a determination leads to a return 217 to the start and a new determination whether the vehicle is in motion 201. In order to improve the accuracy of each repetition, at block 219 the raw sensor signal information can be rotated in accordance with the new determinations of roll, pitch, and yaw. With each estimation of the misalignment, the results are provided as feedback to the raw inertial sensor signals to rotate them to be more closely aligned with the vehicle. In the next repetition, the compensated inertial signals are used. This feedback mechanism allows the misalignment angles to converge to the highest accuracy that the system can provide. This convergence is also faster using the feedback mechanism, especially for the yaw, which converges more slowly.

FIG. 2 also shows optional operations that are performed in other embodiments before each repetition of the roll, yaw, and pitch determinations. One option is to use a timer to reduce the frequency of the repetitions. The timer is used so that processing resources can be used for another purpose or to allow some time for conditions to change before new measurements are made. A counter can also be used to limit the number of repetitions. Three or four repetitions provide sufficient accuracy for some types of equipment. In this example, the counter stops the misalignment corrections after four measurements have been made. The particular number for any particular application can be selected to suit the use of the equipment and its design.

A power detection or power on detector can be added to trigger a new misalignment correction cycle each time the power is cycled. In this way, whenever a PND is turned on, it will redetermine the misalignment angles. It is likely that if a PND has been turned off and then back on, then it will have been moved in the vehicle and is therefore probably in a new position.

A motion detector can also be used. The motion detection can be performed by the accelerometers 102 or by another device. Rather than detecting the more gentle motion of the vehicle, this motion detector detects more abrupt movements that might correspond to the PND being picked up or snapped into a cradle. The motion detector provides another way to determine whether the PND has just been placed into the vehicle in a new position. Other operations can also be added. The examples discussed above are provided as examples, and none of them are required. In addition the feedback cycle can be removed. More or fewer parameters can also be updated than those suggested at blocks 205, 209, and 213. The particular configuration can be adapted to a variety of different circumstances and uses of the navigation device.

Figure 3:
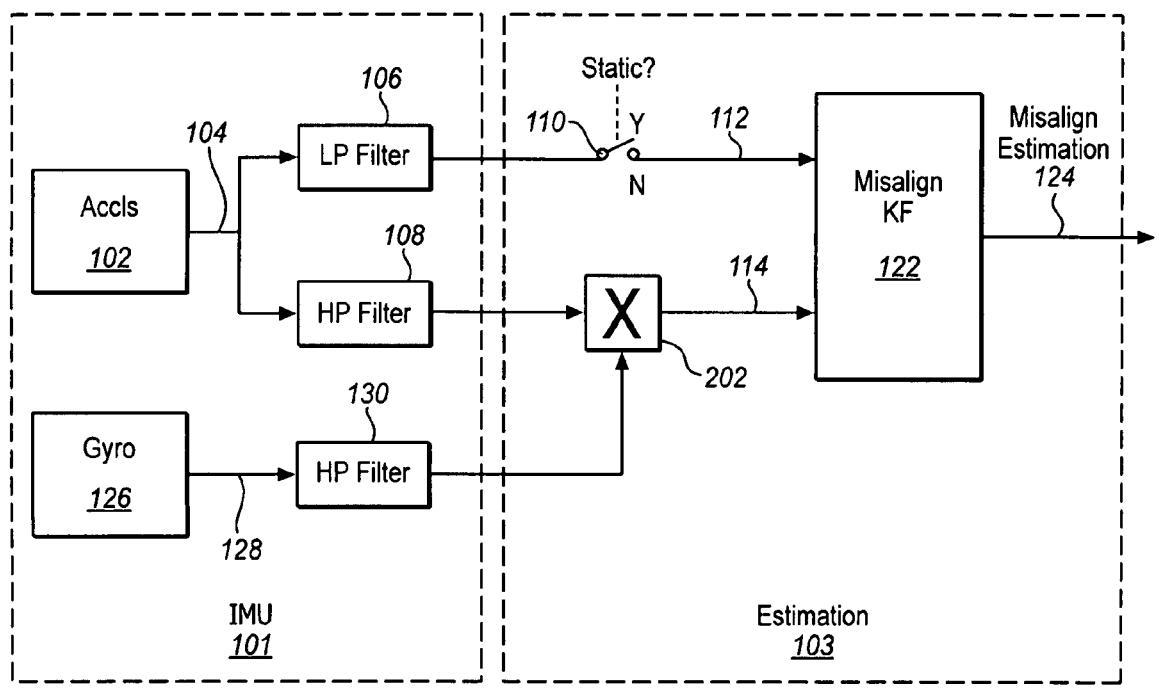
FIG. 3 is a functional block diagram of a portion of a navigation device to show estimating the mounting misalignment of the navigation device, according to another embodiment of the present invention.

FIG. 3 shows an alternative configuration to the alignment estimation system of FIG. 1. The configuration of FIG. 3 is particularly useful, when a full IMU (Inertial Measurement Unit) 101 configuration is available (for example a three-axis gyro and a three-axis accelerometer). However, as with the configuration of FIG. 1, the configuration of FIG. 3 can be used by synthesizing, extrapolating or estimating values for all three axes. In addition, some IMU's use more than three gyros and accelerometers, in order to provide higher accuracy or higher reliability. A three-axis output of such an IMU can alternatively be used. In the example of FIG. 3, the IMU signals are applied to an estimation module 103. In this estimation module, the cross product of the accelerometer AC signal and the gyro AC signal is taken and provided to the filtering system.

The cross product is particularly suitable for misalignment estimation. The cross product vector has a significant magnitude only when the vehicle makes turns and causes centrifugal acceleration, and it is always pointing forward. The cross product inherently filters out many other disturbances. Accordingly, it can be used to provide a simpler and more accurate estimation. The cross product vector plus the gravity vector can be used to efficiently estimate the misalignment.

Referring to FIG. 3, an accelerometer 102 and gyroscope 126 produce the required signals 104, 128, respectively, in three axes as described above. Alternatively, the accelerometer and gyroscope can provide less than all three axes and the missing values can be estimated or constants can be used. The accelerometer signal 104 goes through a low pass filter 106 to isolate the acceleration of gravity. As in FIG. 1, a logical switch 110 can be used so that gravity is only measured while the vehicle is moving. The resulting gravity signal 112 is supplied to the Kalman filter.

A three-axis accelerometer signal 104 is also applied to a high pass filter 108. Similarly, a three-axis gyroscope signal 128 is applied to a high pass filter 130. The two filtered three-axis signals are applied as vectors to a multiplier 202 that takes the cross product of the two signals. The cross product represents a cross product of the acceleration AC signals from the three-axis accelerometer and the gyro AC signals from the three-axis gyro sensor. The cross product vector 114 is fed into the misalignment estimation filtering system 122 together with the gravity vector 112. Using this information, the filtering system provides a misalignment estimation similar to that of FIG. 1. This can be done using a Kalman filter, as described above, or any of a variety of other approaches, for example a Least Mean Square operation. As in FIG. 1, the misalignment vector can be used to correct the sensor data or it can be used directly by a location determination system.

Figure 4:
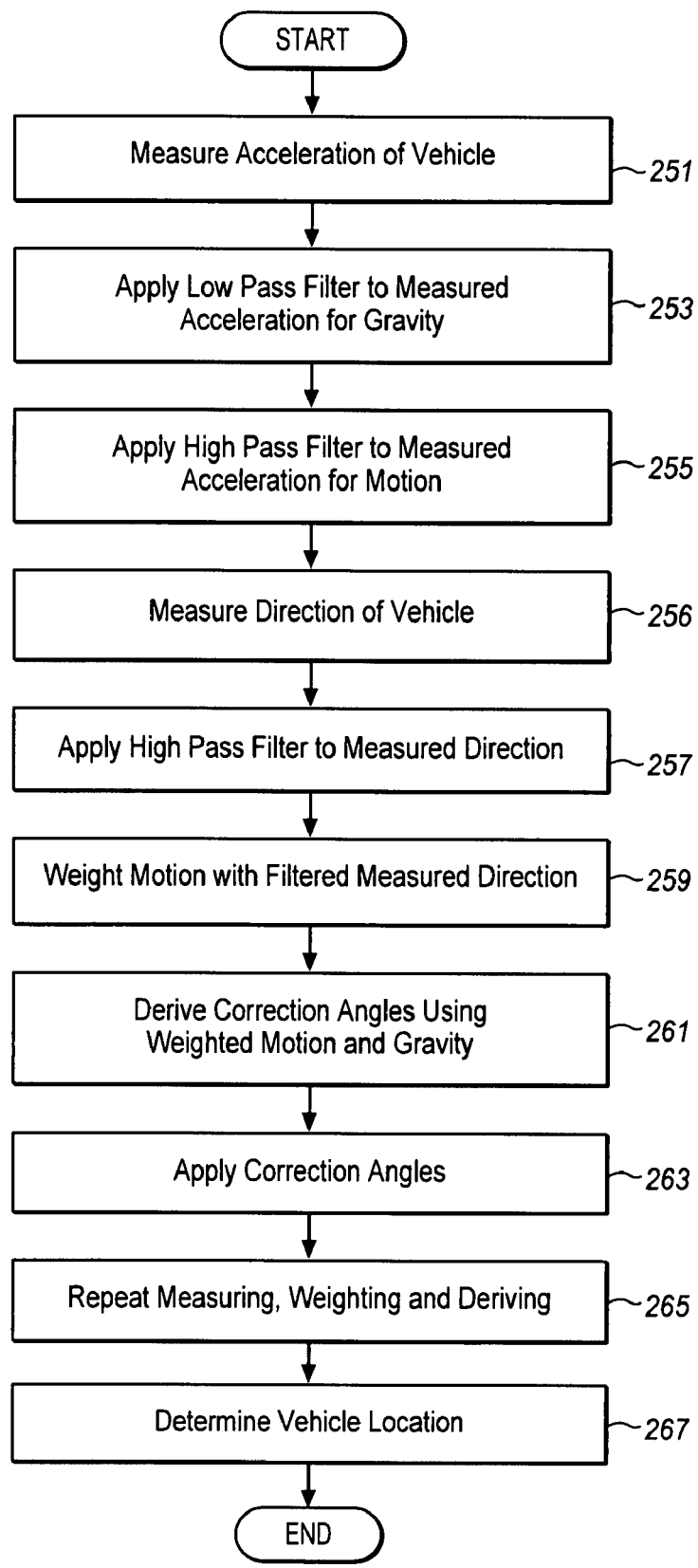
FIG. 4 is a process flow diagram of estimating the mounting misalignment of a navigation device using the functions of FIGS. 1 and 3, according to an embodiment of the present invention.

FIG. 4 is a process flow diagram representing the operation of the configurations of FIGS. 1 and 3. The process of FIG. 4, begins at block 251 with measuring the acceleration of the vehicle. As mentioned above, the accelerometers can take a variety of different forms and can be independent or a part of an integrated IMU. At block 253, a low pass filter is applied to the measured acceleration to obtain a gravity signal. At block 255, a high pass filter is applied to the measured acceleration to separate out a motion acceleration signal. As shown in FIGS. 1 and 2, a variety of conditions and decisions can be applied to the measuring operations to help ensure that the signal is useful.

At block 256, the steering rate or rate of change in the direction of the vehicle is measured. This corresponds to the lateral or centrifugal acceleration mentioned above. In one embodiment, this is done with a gyroscope that is independent or part of an IMU or it can be estimated based on other criteria. A variety of different gyros can be used. A one-axis gyro device which gives heading change information, a two-axis gyro device, which can be a single two-axis device or two one-axis devices, or a three or more axis gyro device can be used. The three-axis device can use one-axis or two-axis devices. At block 257, a high pass filter is applied to the direction change rate to filter out low frequency signals and retain signals which represent vehicle motions.

At block 259, the motion acceleration signal is weighted with the measured steering rate. The weighting generates a proportional weighting factor and an inverse proportional weighting factor from the measured steering rate. The proportional weighting factor provides a higher weight for a centrifugal acceleration component of the motion acceleration signal, while the inverse proportional weighting factor provides a higher weight for a forward acceleration component of the motion acceleration signal. The weighting allows the centrifugal acceleration and the forward acceleration to be separated. As mentioned above, the weighting can also be performed by taking a cross product of the motion acceleration signal with the measured steering rate. This can most simply be done by taking the cross product of the acceleration signals from a three-axis accelerometer and the gyro signals from a three-axis gyro sensor. However, the particular operations can be modified to accommodate less expensive hardware.

At block 261, misalignment correction angles are derived. The angles correspond to the misalignment between the navigation device and the vehicle. The angles are derived using the weighted motion acceleration signals and the gravity signal. However, the particular input signals can be modified to suit a particular application. In one example, a Kalman filtering system is used to translate the gravity signal, the centrifugal acceleration signal and the forward acceleration signals to three angles of misalignment. The Kalman filter, in effect, derives rotation angles in three orthogonal axes.

Once derived, the misalignment angles can be used as correction angles to correct the raw sensor data. At block 263, the correction angles are applied. This can be done by applying them to the sensor data, or by applying them to the location sensor. In this example, the correction angles are applied to the sensor data and then at block 265, the operations of blocks 251-263 are repeated. In other words, measuring, weighting and deriving are repeated in order to derive new correction angles. As a result, the process is iterative and with each iteration the correction angles are more accurate.

The number of repetitions can be selected based on the desired accuracy and the limitations of the IMU and location system.

Given the correction angles, at block 267, the location of the vehicle is determined using the angles or the corrected sensor data. The location system can be a satellite positioning system, a terrestrial radio positioning system, or any other system. While the correction angle processes are described as being performed before the vehicle location is determined, this is not necessary for the invention. In a typical PND using GPS, when the device is first turned on, a few minutes can pass before the first satellite based position can be determined. This delay allows the correction angles to be determined in time to be used for the first satellite position fix.

The correction angles can then be further fine-tuned for later satellite position updates. However, in a different usage scenario or with a different location determination system, the first position fix can be determined before the correction angles are determined. It can also happen that the vehicle is not moving for a few minutes. Based on block 201 of FIG. 2, a satellite position fix can then be made before any correction angles can be determined. If an initial satellite position fix is determined before the correction angles are determined, then the initial fix can be used. The initial or later fixes can then be corrected with the misalignment angles after these have been determined. The particular ordering of operations between the location system and the correction angle determinations can be adapted to suit different conditions.

Figure 5:
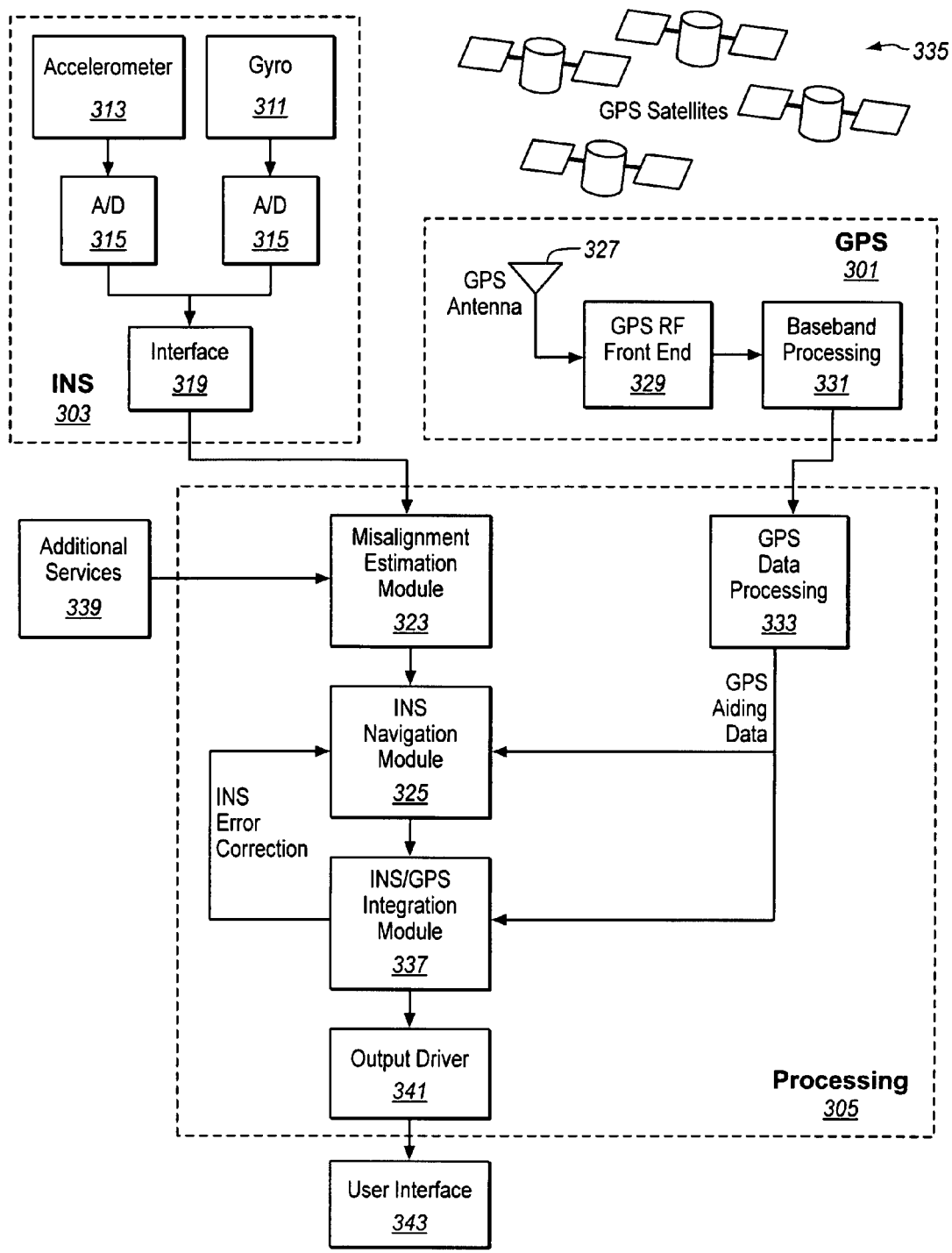
FIG. 5 is a block diagram of a navigation device suitable for use with the functions and processes of FIGS. 1 through 4, according to an embodiment of the present invention.

FIG. 5 provides an example of a navigation device 300 suitable for use with the correction angle techniques discussed above. In the example of FIG. 5, the system is an integrated navigation system with a GPS subsystem 301, an INS (Inertial Navigation System) subsystem 303, and a signal processing subsystem 305. It also obtains other external measurement references such as odometer and magnetic sensor data 339.

The INS subsystem 303 includes gyroscope sensors 311 and accelerometer sensors 313. These can take any of the forms and configurations described above. The measurements are first applied to respective digital to analog converters 315, 317. The digital signals are first applied to an interface 319 that allows the digital signals to be presented to the system processor 305 in the format and timing that is appropriate for the system. Properly interfaced, the digital signals are then sent to a misalignment compensation module 323. This module compensates the signals, as described above and shown in FIGS. 1, 3, and 4, for misalignment in the vehicle.

The misalignment estimation can include an initial attitude alignment and then iterative updates to mechanization equations to calculate the position, velocity, and attitude of the navigation device. As also mentioned above, this error correction, or angle rotation, can alternatively be incorporated into the position determination (module 337) instead of being applied to the sensor data (module 323). After compensation, the digital signals are sent to an INS navigation module 325 for INS navigation data processing.

The inertial navigation system, given an accurate initial position, maintains an accurate position for the navigation device as the vehicle moves. The accuracy of the positioning will depend upon the accuracy of the sensors. In commercial aviation, an accurate position fix can be maintained over hundreds of miles. Any sensor errors accumulate over time, so that the accuracy of the position degrades with time and distance. With low cost MEMS sensors, the error will increase more quickly, however, the INS can be made accurate enough to allow for accurate positioning under bridges, between buildings and through tunnels.

The GPS subsystem 301 can be used for initial position determinations and to correct the position determinations from the INS 303. In the example of FIG. 5, the GPS subsystem, in the form of a GPS receiver 301, has a GPS antenna 327, RF (Radio Frequency) front end 329, and GPS baseband signal processing 331. The antenna receives signals from a constellation of GPS satellites 335 which are down converted in the RF front end and demodulated in the baseband processing.

The received data and timing is sent to a GPS data processing module 333 to determine the position of the navigation device. Other information can also be determined such as the rate of change of position or velocity, absolute time, GPS satellite pseudorange, Doppler frequencies and any other data that might be helpful for a particular embodiment. This data is sent to an INS/GPS integration module where it is used to aid the position determination of the INS module 325. Using this information, INS errors can be estimated in the INS/GPS integration module, and in turn, the INS subsystem provides higher accuracy.

The GPS data is also provided to the INS navigation module. This allows for the INS navigation module to determine, for example, whether the vehicle is in motion, accurate timing, and other information as described above. The INS navigation module and the INS/GPS integration module are connected together to allow the location determination to be determined iteratively. As described above, corrections from the GPS data can be provided to improve the INS data and the improved INS data can be used to provide a better position fix. While a GPS receiver is shown in FIG. 5, any other positioning system can be used as an alternative or as an addition. The location system can also be part of another device, such as a wireless telephone or tracking device.

The determined position is applied from the INS/GPS Integration module to an output driver 341. The output driver applies the position to a stored map, image or any other suitable frame of reference so that the user can understand the position and use the information. The output driver is shown connected to a user interface 343. This can include a display, such as a small touch screen, to show the position results to the user. There can also be a speaker, a keypad, a microphone, a touch pad and wireless interfaces to other interface devices. The user interface allows the user to determine how the position information is to be displayed. Additional resources (not shown) can be used to determine the position of possible destinations, to compute and display routes, to show surrounding landmarks and to perform any other desired functions to further enhance the usefulness of the position determination.

The modules of the processing section can be implemented as individual ASICs (Application Specific Integrated Circuits), DSPs (Digital Signal Processors) or similar devices, each with their own instruction and operand memory and firmware. Some of the modules can be combined with the illustrated modules or with other modules not shown. Alternatively, a more general purpose controller or processor can be used to perform each of these functions. The controller can include an internal memory for instructions and operands and in addition or instead can have an external memory. The controller can have dedicated circuits for performing the operations in FIGS. 1 through 4 or all of these functions can be performed by general purpose circuits. The GPS and INS function blocks can be implemented as a separate GPS chip and a separate INS or IMU chip. Alternatively, they can each be integrated in whole, or in part, with the processing block.

The navigation device 300 is shown as a single system. This type of system is suitable for application to a PND, for example. However, the GPS subsystem and the INS subsystem can be separate and independent from the processing subsystem and from each other. For example, if a vehicle has any integrated sensors, these can be used by the processing subsystem. In addition, particular components, can be provided separately, such as antennas, power supplies, etc. The processing subsystem or the whole device can be provided as a PND, as a navigation component of a smartphone, a PDA (Personal Digital Assistant), or any other portable device.

The approaches described herein can be used in any type of vehicle, including a car, truck, bus, boat, or airplane. It can be used for a wide variety of different navigation devices with differing levels of equipment and complexity. A lesser or more equipped INS, location system, and processing section than the examples described above can be preferred for certain implementations. Therefore, the configuration of the functions and the equipment can vary from implementation to implementation depending upon numerous factors, such as price constraints, performance requirements, technological improvements, or other circumstances. The particular nature of any attachment or interface with the vehicle can be adapted to the intended use of the device. Any one or more of the subsystems, interfaces, or interconnects can be eliminated from this system and others can be added. For example, information from the vehicle or from other devices can be provided based on different wired or wireless protocols.

While embodiments of the invention have been described in the context of determining the misalignment between a PND and a vehicle, the approaches and techniques described here can be applied to a wide variety of different contexts in which sensors can be misaligned with another reference frame. In addition, embodiments of the invention can be applied to fine-tune or calibrate fixed installations.

In the description above, for purposes of explanation, numerous specific details are set forth in order to provide a thorough understanding of the present invention. It will be apparent, however, to one skilled in the art that the present invention can be practiced without some of these specific details. In other instances, well-known structures and devices are shown in block diagram form.

The present invention can include various steps. The steps of the present invention can be performed by hardware components, such as those shown in the Figures, or can be embodied in machine-executable instructions, which can be used to cause general-purpose or special-purpose processor or logic circuits programmed with the instructions to perform the steps. Alternatively, the steps can be performed by a combination of hardware and software.

The present invention can be provided as a computer program product which can include a machine-readable medium having stored thereon instructions which can be used to program an agent or a computer system to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention can also be downloaded as a computer program product, wherein the program can be transferred from a remote computer to a requesting computer by way of data signals embodied in a carrier wave or other propagation medium via a communication link (e.g., a modem or network connection).

Many of the methods and apparatus are described in their most basic form but steps can be added to or deleted from any of the methods and components can be added or subtracted from any of the described apparatus without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method to determine a misalignment of a navigation device with respect to a vehicle comprising:
   applying a high pass filter to a measured acceleration of the vehicle to produce a motion acceleration signal;
   weighting the motion acceleration signal with a measured steering rate of the vehicle; and
   deriving, using a processor, misalignment parameters for the navigation device with respect to the vehicle using the weighted motion acceleration signal.

2. The method of claim 1, further comprising:
   determining if the vehicle is moving;
   applying a low pass filter to the measured acceleration while the vehicle is moving to produce a gravity signal; and
   wherein deriving misalignment parameters comprises also using the gravity signal.

3. The method of claim 1, wherein deriving misalignment parameters comprises applying a Kalman filtering system.

4. The method of claim 1, wherein weighting comprises;
   generating a proportional weighting factor from the measured steering rate; and
   multiplying the motion acceleration signal with the proportional weighting factor to produce a centrifugal acceleration component of the motion acceleration signal.

5. The method of claim 1, wherein weighting comprises;
   generating an inverse proportional weighting factor from the measured steering rate; and
   multiplying the motion acceleration signal with the inverse proportional weighting factor to produce a forward acceleration component of the motion acceleration signal.

6. The method of claim 2, wherein weighting comprises using the measured steering rate to weight the motion acceleration signal so that a centrifugal acceleration and a forward acceleration are produced, and wherein deriving misalignment parameters comprises using a Kalman filtering system to produce three misalignment angles based on the gravity signal, the centrifugal acceleration signal and the forward acceleration signals.

7. The method of claim 1, further comprising correcting raw sensor data using correction angles obtained from the derived misalignment parameters.

8. The method of claim 7, further comprising determining new misalignment parameters after correcting the raw sensor data and correcting the raw sensor data again using the new misalignment parameters.

9. The method of claim 8, further comprising determining the location of the vehicle after correcting.

10. The method of claim 9 wherein determining the location comprises determining the location using a satellite positioning system.

11. The method of claim 1, further comprising using odometer signals from the vehicle to determine whether the motion acceleration signal corresponds to the vehicle being in motion.

12. The method of claim 1, further comprising measuring the acceleration along three orthogonal axes using a three axis accelerometer to produce the measured acceleration.

13. The method of claim 1, further comprising receiving a measured acceleration from an external sensor.

14. The method of claim 1, further comprising measuring the steering rate using a vertical gyroscope.

15. The method of claim 1, wherein the misalignment parameters comprise misalignment correction angles corresponding to the misalignment between the navigation device and the vehicle.

* * * * *

UNITED STATES PATENT AND TRADEMARK OFFICE
CERTIFICATE OF CORRECTION

| | | |
|---|---|---|
| PATENT NO. | : 8,086,405 B2 | Page 1 of 1 |
| APPLICATION NO. | : 11/823964 | |
| DATED | : December 27, 2011 | |
| INVENTOR(S) | : Han et al. | |

It is certified that error appears in the above-identified patent and that said Letters Patent is hereby corrected as shown below:

In Column 4, Line 11, delete "z-axix" and insert -- z-axis --, therefor.

In Column 5, Line 63, delete "filter. 130;" and insert -- filter 130; --, therefor.

In Column 6, Line 60, delete "below:" and insert -- below. --, therefor.

In Column 7, Line 21, in Eq. 7, delete "$x_{i+1=xi}$" and insert -- $x_{i+1} = x_i$ --, therefor.

In Column 14, Line 29, in Claim 4, delete "comprises;" and insert -- comprises: --, therefor.

In Column 14, Line 36, in Claim 5, delete "comprises;" and insert -- comprises: --, therefor.

In Column 14, Line 61, in Claim 10, delete "9" and insert -- 9, --, therefor.

Signed and Sealed this
Twenty-eighth Day of August, 2012

David J. Kappos
*Director of the United States Patent and Trademark Office*